(12) United States Patent
Twelves, Jr. et al.

(10) Patent No.: US 8,383,985 B2
(45) Date of Patent: Feb. 26, 2013

(54) SYSTEM AND METHOD FOR AN INTEGRATED ADDITIVE MANUFACTURING CELL FOR COMPLEX COMPONENTS

(75) Inventors: Wendell V. Twelves, Jr., Glastonbury, CT (US); James W. Norris, Lebanon, CT (US); Bernard J. Raver, Ellington, CT (US)

(73) Assignee: United Technologies Corporation, Hartford, CT (US)

(*) Notice: Subject to any disclaimer, the term of this patent is extended or adjusted under 35 U.S.C. 154(b) by 0 days.

(21) Appl. No.: 12/856,924

(22) Filed: Aug. 16, 2010

(65) Prior Publication Data

US 2010/0305742 A1   Dec. 2, 2010

Related U.S. Application Data

(62) Division of application No. 11/708,955, filed on Feb. 21, 2007, now Pat. No. 7,777,155.

(51) Int. Cl.
*B23K 26/12* (2006.01)
*G06F 19/00* (2011.01)

(52) U.S. Cl. ............ 219/121.86; 700/95; 700/118

(58) Field of Classification Search .......... 700/95, 700/117, 118, 119; 219/76.14, 121.86, 121.15, 219/121.21, 121.63, 121.85
See application file for complete search history.

(56) References Cited

U.S. PATENT DOCUMENTS

| | | | |
|---|---|---|---|
| 3,576,540 A | 4/1971 | Fair et al. | |
| 4,689,467 A * | 8/1987 | Inoue | 219/121.84 |
| 4,722,298 A | 2/1988 | Rubin et al. | |
| 5,076,205 A * | 12/1991 | Vowles et al. | 118/719 |
| 5,083,364 A | 1/1992 | Olbrich et al. | |
| 5,301,863 A | 4/1994 | Prinz et al. | |
| 5,353,490 A | 10/1994 | Kukuljan | |
| 6,197,386 B1 * | 3/2001 | Beyer et al. | 427/450 |
| 6,312,525 B1 * | 11/2001 | Bright et al. | 118/719 |
| 6,393,687 B1 * | 5/2002 | Friedrich | 219/121.67 |
| 6,598,279 B1 | 7/2003 | Morgan | |
| 6,751,516 B1 | 6/2004 | Richardson | |
| 6,940,037 B1 | 9/2005 | Kovacevic et al. | |
| 7,020,539 B1 | 3/2006 | Kovacevic et al. | |
| 2002/0019683 A1 | 2/2002 | White et al. | |
| 2002/0147521 A1 * | 10/2002 | Mok et al. | 700/119 |
| 2002/0184746 A1 | 12/2002 | Kusmierczyk et al. | |
| 2004/0107019 A1 * | 6/2004 | Keshavmurthy et al. | 700/118 |
| 2005/0173380 A1 | 8/2005 | Carbone | |
| 2005/0274661 A1 | 12/2005 | Jackson | |
| 2007/0127029 A1 * | 6/2007 | Chen | 356/445 |
| 2007/0205184 A1 * | 9/2007 | Mazumder et al. | 219/121.84 |

FOREIGN PATENT DOCUMENTS

| | | |
|---|---|---|
| JP | 687073 A | 3/1994 |
| JP | 2000150136 A | 5/2000 |

OTHER PUBLICATIONS

European Search Report for EP Patent Application No. 08250563.7, dated Jul. 6, 2009.

* cited by examiner

*Primary Examiner* — Geoffrey S Evans
(74) *Attorney, Agent, or Firm* — Bachman & LaPointe, P.C.

(57) ABSTRACT

An integrated additive manufacturing cell (IAMC) that combines conventional manufacturing technologies with additive manufacturing processes is disclosed. Individual IAMCs may be configured and optimized for specific part families of complex components, or other industrial applications. The IAMCs incorporate features that reduce hardware cost and time and allow for local alloy tailoring for material properties optimization in complex components.

10 Claims, 6 Drawing Sheets

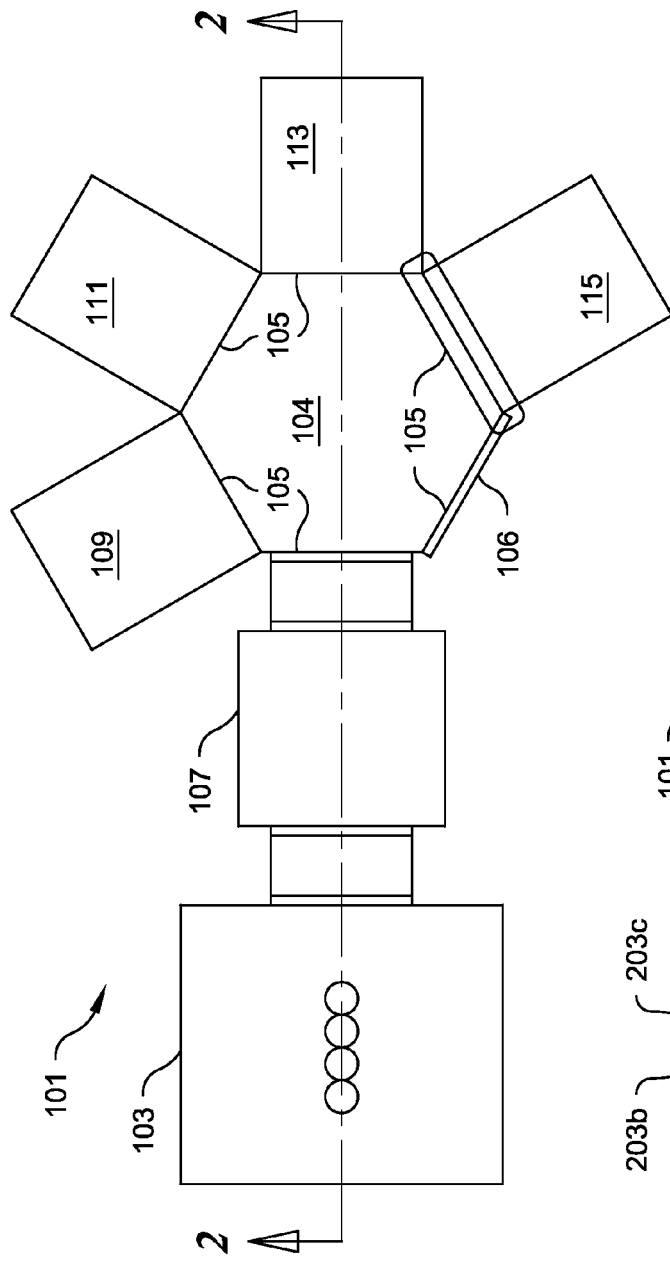
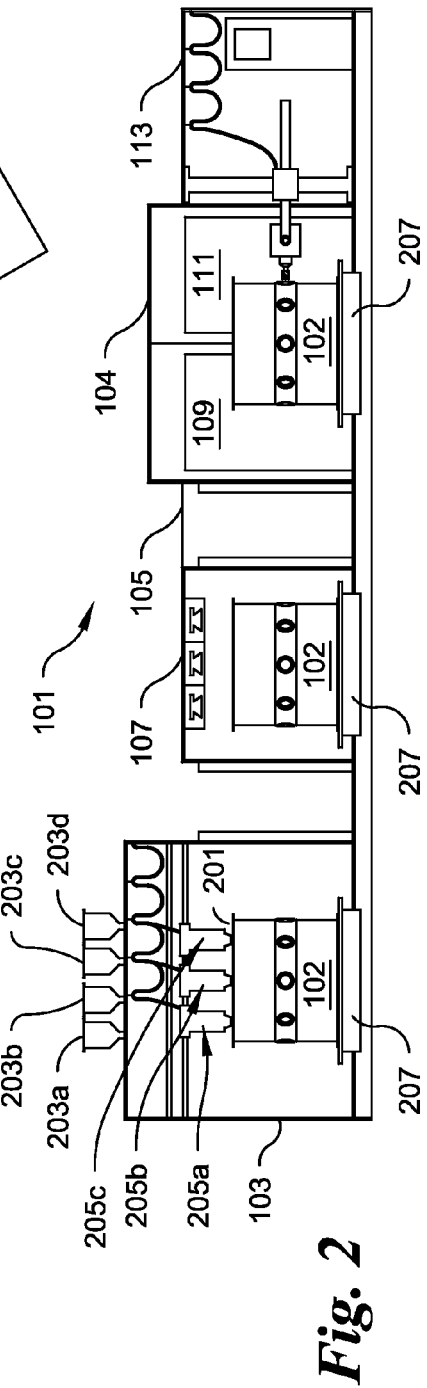
Fig. 1
Fig. 2

SYSTEM AND METHOD FOR AN INTEGRATED ADDITIVE MANUFACTURING CELL FOR COMPLEX COMPONENTS

CROSS-REFERENCE TO RELATED APPLICATION

This is a divisional application of Ser. No. 11/708,955, filed Feb. 21, 2007, now U.S. Pat. No. 7,777,155, and entitled System and Method for an Integrated Additive Manufacturing Cell for Complex Components, the disclosure of which is incorporated by reference herein in its entirety as if set forth at length.

BACKGROUND OF THE INVENTION

The invention relates generally to the field of automated manufacturing. More specifically, embodiments of the invention relate to methods and systems for automated manufacturing cells.

Turbine and rocket engine components are typically fabricated using a wide variety of manufacturing technologies. Many of the component parts are fabricated using high temperature superalloy materials. These alloys tend to be hard, high strength materials that are difficult, time consuming and expensive to machine. Without resorting to mechanical joining operations, conventional manufacturing processes also limit the material in the workpiece to one specific alloy.

Typical manufacturing processes have critical issues that challenge their efficiency. Significant time and cost for component fabrication occurs due to material lead time and hard tooling for complex shapes. Usually, no non-destructive testing (NDT) is included in the automated process.

What is needed is an additive manufacturing process that improves product quality and includes processes that require minimal material removal due to the near net shape of the workpiece. The manufacturing process should reduce secondary machining needs and incorporate an architecture that eliminates setup and transfer times due to concurrent secondary machining operations.

SUMMARY OF THE INVENTION

The inventors have discovered that it would be desirable to have methods and systems that combine conventional manufacturing technologies with additive manufacturing processes in an integrated additive manufacturing cell (IAMC).

Individual IAMCs may be configured and optimized for specific part families of turbine and rocket engine components. An IAMC is not limited to aerospace applications and may be used for other industrial applications. The workpiece grown in the IAMC environment may incorporate features such as integral fixturing tabs and stiffening ribs to facilitate part handling and secondary machining operations. The parts will be grown on target plates with transfer and locating features for instant setup on subsequent machine tools such as microwave heat treatment antechambers, concurrent secondary operations, real-time white light surface geometry inspection, real-time non-destructive testing, real-time repair and blended metal powder delivery to the deposition head that reduce hardware cost and time and allow for local alloy tailoring for material properties optimization in engine components.

One aspect of the invention provides an additive machining cell system. Systems according to this aspect of the invention comprise an enclosed central manufacturing cell having a plurality of access ports, and a mechanical and electrical port interface associated with each access port, wherein the interface is configured to couple power, communications, and mechanical utilities with an external module.

Another aspect of the system is where each external module further comprises an enclosure having a module access port, and a mechanical and electrical module port interface associated with the module access port, wherein the module port interface is configured to couple power, communications, and mechanical utilities in matching correspondence with the central manufacturing cell port interfaces.

Another aspect of the system is where the central manufacturing cell houses an additive manufacturing process.

Another aspect of the system is where the additive manufacturing process is selected from the group of processes consisting of a powder fed/laser heated melt pool, a wire fed/laser heated melt pool, a powder fed/electron beam heated melt pool, a wire fed/electron beam heated melt pool, or a short circuit gas metal arc.

Another aspect is a method of fabricating a component part using an integrated additive manufacturing cell. Methods according to this aspect of the invention preferably start with importing CAD/CAM software files, determining secondary operations necessary for fabricating the component part, coordinating the secondary operations to yield an efficient order of simultaneous and sequential operations, assembling the integrated additive manufacturing cell with modules corresponding to the secondary operations, performing machine instruction coding for each additive manufacturing cell operations wherein one of the operations is an additive manufacturing process, downloading the machine instruction coding into a control system, and fabricating the component part according to the coding.

The details of one or more embodiments of the invention are set forth in the accompanying drawings and the description below. Other features, objects, and advantages of the invention will be apparent from the description and drawings, and from the claims.

BRIEF DESCRIPTION OF THE DRAWINGS

FIG. 1 is an exemplary plan view of an integrated additive manufacturing cell (IAMC).

FIG. 2 is an exemplary section view of the integrated additive manufacturing cell shown in FIG. 1 taken along line 2-2.

DETAILED DESCRIPTION

Figure 3:
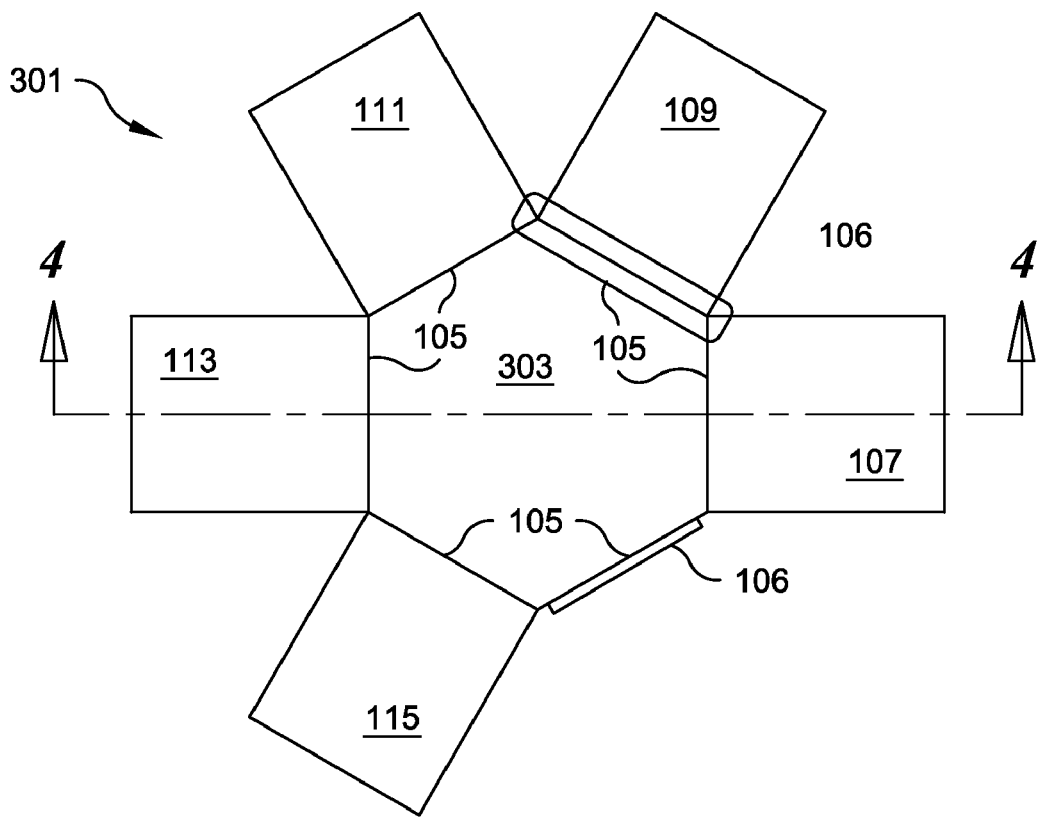
FIG. 3 is an exemplary plan view of an advanced IAMC.

Embodiments of the invention will be described with reference to the accompanying drawing figures wherein like numbers represent like elements throughout. Further, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. The terms "mounted," "connected," and "coupled" are used broadly and encompass both direct and indirect mounting, connecting, and coupling. Further, "connected" and "coupled" are not restricted to physical or mechanical connections or couplings.

Additive manufacturing techniques comprise solid freeform fabrication (SFF) methods. These methods produce prototypes of complex freeform solid objects directly from computer models without part-specific tooling or knowledge. These techniques are used for rapid prototyping of mechanical elements. Additive manufacturing typically means fabrication processes that include more than just layered processes, but also related systems of material addition, subtraction, assembly, and insertion of components made by other processes.

Additive manufacturing processes are emerging as rapid manufacturing techniques for mass-customized products. These techniques may be effectively used for true manufacturing and decrease the time to manufacture new products. The complexity that may be obtained from SFF parts comes at low cost as compared to other manufacturing processes such as machining. The IAMC system can quickly create a near net shape workpiece of complex geometry. A broad range of conventional metal shaping processes may be replaced, or reduced, to minimal secondary operations. The IAMC simplifies the manufacturing of the difficult to handle refractory super alloys used in high temperature turbine engines and rocket motors.

Additive manufacturing processes are similar to building up metal using a conventional weld bead. The difference is the source of the heat which may be a laser or electron beam, and the motion control system that allows shaped parts to be grown. With the exception of cast manufacturing, most conventional manufacturing processes are material reduction processes that remove material from a workpiece using some kind of machining process. In contrast, additive manufacturing processes build up a workpiece by adding material via a weld bead that deposits material in layers.

The IAMC incorporates a part family oriented architecture that integrates solid free form fabrication capabilities with mature computer numerical control (CNC) software, state-of-the-art secondary metal working process modules, and a system supervisory software package. The IAMC architecture optimizes both cost and cycle time for producing specific families of components.

The ability of the additive manufacturing processes to grow complex geometry near net shape workpieces without tooling enables conventional processes such as casting, forming, forging, rolling, extruding, pressing, stretch forming, milling, turning, drilling, sawing, broaching, shaping, planing, and joining (welding, brazing, bolted joints) or diffusion bonding to be replaced or reduced. The system embodiments may fabricate hardware using the integrated machining and additive processes simultaneously.

The IAMC allows near net shaped, aerospace quality workpieces to be fabricated in a matter of hours without hard tooling. These processes exploit the inventory advantages of storing material in powder or wire form until needed. The IAMC integrates part family post-deposition operations such as heat treatment, secondary machining modules (milling, drilling, grinding, broaching, etc.), white light optical inspection techniques, high sensitivity non-destructive evaluation (NDE), process monitoring and control, and continuous process parameter recording. These technologies are integrated with the additive deposition processes to perform feature and finishing operations either simultaneously, or in sequence to allow for the shortest manufacturing time. Simultaneous processing combined with the minimal material removal requirement for a near net shape workpiece allows for part fabrication at unprecedented speeds.

One IAMC benefit is a reduction in the number of steps a workpiece must go through from start to finish. This is achieved by the additive manufacturing process fabricating a near net shape workpiece without tooling that only needs minimal subsequent secondary operations. The additive process allows specific fixturing tabs to be grown on the workpiece depending on the subsequent machining operations to simplify part handling. Sophisticated fixturing allows the workpiece to be presented for either subsequent machining operations, or machining operations concomitant with workpiece growth.

Shown in FIGS. 1 and 2 is a first exemplary configuration of an IAMC cell 101. An additive manufacturing cell (AMC) 103 is the module in the IAMC that performs an SFF or additive deposition, forming the workpiece 102. The IAMC 101 may include a common cell 104 for combining a number of additional modules such as secondary machining and finishing operation modules 109, 111, 113, 115. A conventional or microwave heat treatment furnace 107 may be included if necessary for post deposition material stress relief. A robotic workpiece 102 cart 207 effectively couples the AMC 103, heat treatment furnace 107 and common cell 104 together.

The common cell 104 has a plurality of access ports 105 that accept different types of machining modules, or other material manipulation device modules. The geometry of the access ports 105 frames are configured to allow for an airtight, environmental seal between a module and the common cell 104. The exemplary common cell 104 is configured as a hexagon in plan view having six access ports 105, one located per side. Other configurations having any number of ports 105 may be realized. One port may be a workpiece access door 106 for entry to inspect or to remove a workpiece 102 when completed.

Each access port 105 frame 106 (not shown) has mechanical and electrical interfaces located in predetermined locations about its periphery for engaging and coupling with corresponding mechanical and electrical interfaces in matching correspondence on a module port frame. The mechanical and electrical interfaces use compatible electrical and mechanical male/female mating couplings needed to support computer, electrical, pneumatic, hydraulic and other machine tool service needs. In an alternative embodiment, to simplify module exchange and placement, a suite of quick disconnect couplings may be installed on interface panels (not shown) near the port frames and mated with precut cables and hoses fitted with the appropriate couplings for coupling a common cell 104 with a module.

Each module enclosure has a port frame opening in matching correspondence with the common cell 104 ports 105. The common cell 104 to module 109, 111, 113, 115 coupling may be performed using a seal, for example a static gasket or inflatable seal, around the frame in conjunction with a bolted or dogged flange arrangement. The electrical interfaces may comprise a 32 bit or higher computer bus for computer control of the machine tool spindles and other motion control functions, module operations, and communications, and single or multi-phase power couplings for module power using quick disconnects.

The AMC 103 comprises multiple external hoppers, for example, 203*a*, 203*b*, 203*c*, 203*d* at a high elevation for accepting and containing different metal alloys. In alternative embodiments, wire feed spools may substitute for the hoppers 203*a*, 203*b*, 203*c*, 203*d* to feed material to the deposition melt pool 201. For powder fed additive manufacturing technologies, the metal powder in the hoppers is delivered to the laser heated melt pool via an atmospherically sealed array of powder transfer mechanisms and conduits 205a, 205b, 205c that terminate at the deposition head.

The AMC 103 may use several technologies, for example, a powder fed/laser heated melt pool, a wire fed/laser heated melt pool, a powder fed/electron beam heated melt pool, a wire fed/electron beam heated melt pool, a short circuit gas metal arc, or other free form techniques. FIG. 2 shows the IAMC 101 using an exemplary powder fed/laser heated melt pool embodiment. Any additive manufacturing technology may be located and employed in the AMC 103.

The IAMC 101 allows for creating a near, net shape workpiece without needing to relocate the workpiece to different work site locations or facilities. The additional secondary operational modules may house equipment such as the heat treatment/stress relief antechamber 107, a non-destructive testing (NDT) and measurement sensor suite 109, and a suite of secondary machine tools 111, 113, 115 that mate to the common cell 104 via the mechanical and electrical interface 106. The secondary operation machine tool suite 104, 109, 111, 113, 115 is decided by a specific part, or part family, that each IAMC 101 is tailored for. Typical secondary, separate operations that may be performed in an operation module 109, 111, 113, 115 include drilling, milling, turning, grinding, broaching, reaming, shot peening, grit blasting, and polishing.

After a workpiece is grown in the AMC 103 in accordance with CAD/CAM programming instructions executed by a main control system (not shown), the near net-shape completed workpiece may be transferred by the robotic cart 207 (FIG. 2) from the AMC 103 to the heat treatment oven 107 for post-growth stress relief of the deposition process induced residual thermal stresses in the workpiece. During workpiece growth, predetermined fixturing tabs are grown to allow subsequent machining operations to grab and manipulate the workpiece, if necessary, for positioning the workpiece when performing their machining operations. After stress relief, the workpiece 102 may be transferred 207 to the common cell 104 for secondary machining operations. The robotic cart 207 positions the workpiece 102 in the center of the cell 104 where each predetermined machining module may access the workpiece under three-axis computer control to perform its preprogrammed secondary machining operations either in sequence, or in one or more simultaneous activities. The simultaneous operations are coordinated when determining the part to be fabricated and the number of discrete operations that are necessary for part construction. After secondary operations are finished, one of the modules 109, 111, 113, 115 may perform a part inspection. Afterwards, any remaining fixturing tabs are removed, and the access door 106 opened allowing the robotic cart 207 to remove the finished workpiece 102.

The level of integration shown in FIGS. 1 and 2 capitalizes on additive manufacturing processes, computer process control, metallurgical property control, shape-making capability, surface finish capability and real-time inspection and repair capability.

The AMC 103 may be refined to the point that no secondary operations may be required, meaning that the needed shape making, tolerances, and surface finish requirements will be within the capability of the AMC 103 itself.

Figure 4:
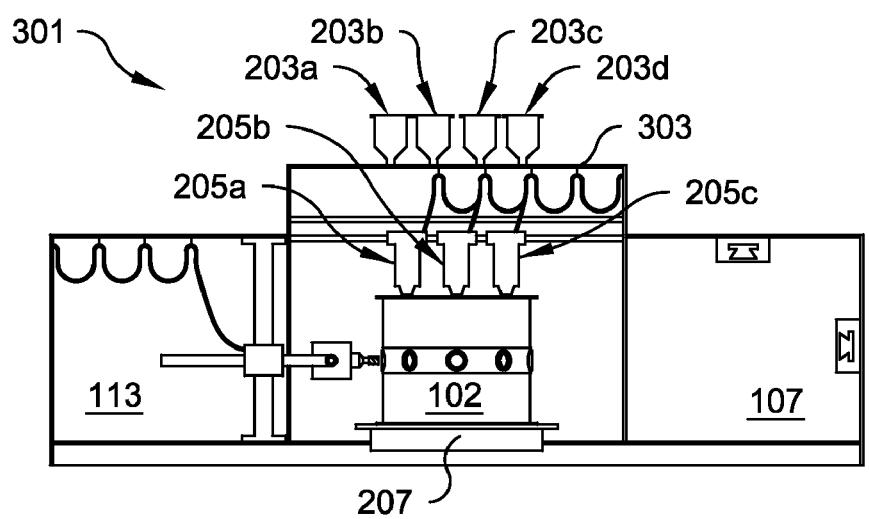
FIG. 4 is an exemplary section view of the advanced IAMC shown in FIG. 3 taken along line 4-4.

Shown in FIGS. 3 and 4 is an exemplary advanced IAMC 301 embodiment. In this embodiment, the IAMC 301 includes secondary operations within the AMC 303. In addition to SFF, the AMC 303 may include laser beam machining (LBM) or laser assisted dry machining.

Laser beam machining is accomplished by precisely manipulating a laser beam to vaporize unwanted, deposited material. LBM includes cutting, welding, drilling, heat-treating, scoring and scribing materials at a very high speed and in a very precise specification. Multiple, simultaneous secondary operations may be performed in the same additive manufacturing environment without contaminating or compromising the material SFF deposition while in-progress.

While a workpiece is being grown during SFF, laser beam machining may provide heat treatment prior to the deposition area and immediately after, using a plurality of beam pulses and durations, thereby controlling the thermodynamic profile of the pre and post deposition metal. The material micro structure and residual thermal stresses will be effectively controlled in real-time as the part is grown. Laser heat-treatment is a surface alteration process that changes the microstructure of metals by controlled heating and cooling. The laser, because of its ability to pinpoint focus both the amount and the location of its energy, can heat treat small sections or strips of material without affecting the metallurgical properties of the surrounding area. Laser heat-treating advantages include precision control of heat input to localized areas, minimum distortion, minimum stress and micro cracking, self-quenching, and is an inherently time efficient process.

Laser scribing may be performed where lines may be produced on the workpiece while SFF is ongoing. The line being laser scribed is only as wide as a single laser beam and is set to a specific tolerance depth. The line consists of a series of small, closely spaced holes in the substrate that is produced by laser energy pulses.

The AMC 303 similarly includes multiple hoppers 303a, 303b, 303c, 303d for accepting and containing the different metal alloys for powder fed additive manufacturing technologies. When the workpiece has been grown to a predetermined size, a movable separation barrier, if needed for contamination control of the deposition process, may be positioned just below the growth surface of the workpiece. The separation barrier may or may not be needed depending on specific workpiece geometry and the nature of the machining operations being performed. Rough machining operations may be performed on a lower part of the workpiece simultaneously with the growth of the workpiece by the additive manufacturing system used. The AMC performs the function of growing the near net shape workpiece. Afterwards, the workpiece is cut off or separated from the target plate and a final inspection is performed.

Post stress relief is performed in a conventional, or microwave heat treat oven 107. Secondary, simultaneous machining operations may be performed. The IAMC 301 AMC 303 may include a number of additional modules such as conventional secondary machining and finishing operation modules 109, 111, 113, 115. The AMC 303 is the central and common manufacturing cell and has a plurality of access ports 305 that accept the different types of machining modules, or other material manipulation device modules as previously described.

The IAMC 301 allows for creating a near, net shape workpiece without needing to relocate the workpiece. The additional operational modules may house equipment such as a heat treatment/stress relief antechamber 107, a nondestructive testing (NDT) and measurement sensor suite 109, and a suite of secondary machine tools 111, 113, 115 that mate to the cell via the mechanical and electrical interface 106. The secondary operation machine tool suite is decided by a specific part, or part family, that each IAMC 101 is configured for. Typical secondary operations that may be performed in an operation module include drilling, milling, turning, grinding, broaching, reaming, shot peening, grit blasting, and polishing.

Figure 5:
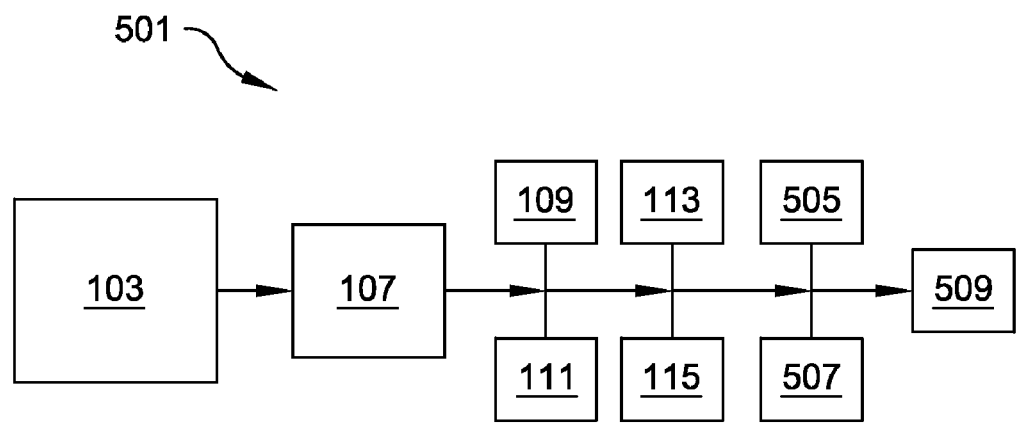
FIG. 5 is an exemplary multiple station IAMC with secondary machining operations.
Figure 6:
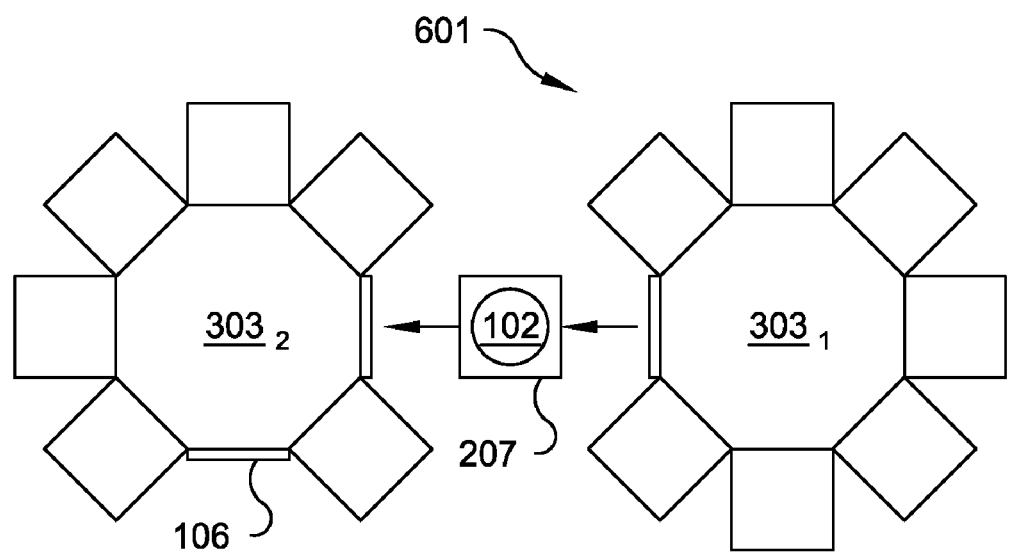
FIG. 6 is an exemplary advanced two station IAMC.

Two additional alternative IAMC fabrication embodiments are shown in FIGS. 5 and 6, and teach IAMC configurations that depend on a desired component architecture which in turn defines the level of IAMC integration. The lowest level of integration is a group technology work cell that locates machine tools adjacent to each other to minimize transfer time of the workpiece (FIG. 5). Medium level integration shown in FIGS. 1 and 2 (previously discussed), combines conventional secondary processes, but leaves the additive manufacturing cell independent. The highest level of integration is shown in FIG. 6 and combines as many operations as possible in the minimum number of individual cells. The highest level uses one or more advanced IAMC embodiments that are shown in FIGS. 3 and 4 such that secondary machining operations may be progressively conducted just below the growth surface of the workpiece and laser tailoring of the thermodynamic profile of melt pool solidification will perform heat treating and stress relief operations as they occur.

For the embodiment shown in FIG. 5, a multiple station IAMC 501 fabricates a near net shape workpiece in an AMC 103. Afterwards, the workpiece is stress relieved in a microwave stress relief chamber 107. Additional machining operations are performed sequentially 109, 111, 113, 115, 505, 507, 509 in post, dedicated group technology work cells. This may include part family specific operations such as milling, drilling, grinding, shot peening, broaching, turning, grit blasting, polishing and other conventional machining operations.

After all machining and treatment operations are performed, the workpiece is separated/removed from a target plate. The target plate for this class of additive manufacturing processes may be the same metal alloy as the material being deposited.

Shown in FIG. 6 is an advanced multiple IAMC 601 architecture employing two advanced IAMCs $303_1$, $303_2$. Each advanced IAMC $303_1$, $303_2$ may work the workpiece 102 depending on the level of complexity of machining an initial growth workpiece, and the need to add more material and additional secondary machining operations. A robotic cart 207 may be used to transfer he workpiece 102 from one advanced IAMC $303_1$ to another $303_2$. Alternatively, the both advanced IAMCs $303_1$, $303_2$ may be coupled together such that the robotic transfer cart 207 travels within a tunnel between the IAMCs $303_1$, $303_2$ to maintain an inert, purged condition.

Figure 7:
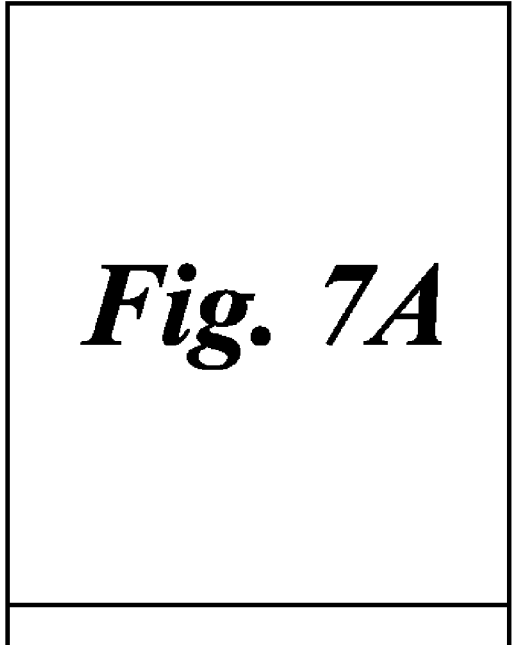
FIG. 7 is an exemplary method of using an IAMC to fabricate a component part with FIG. 7A being a first portion of a flowchart and FIG. 7B being a second portion of the flowchart.
Figure 7:
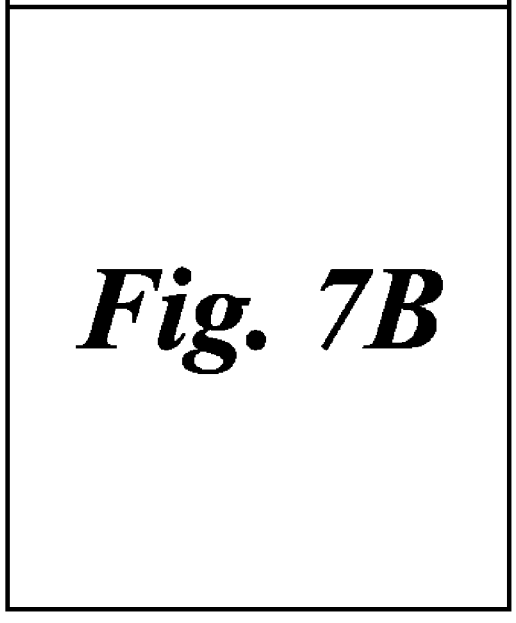
Figure 7A:
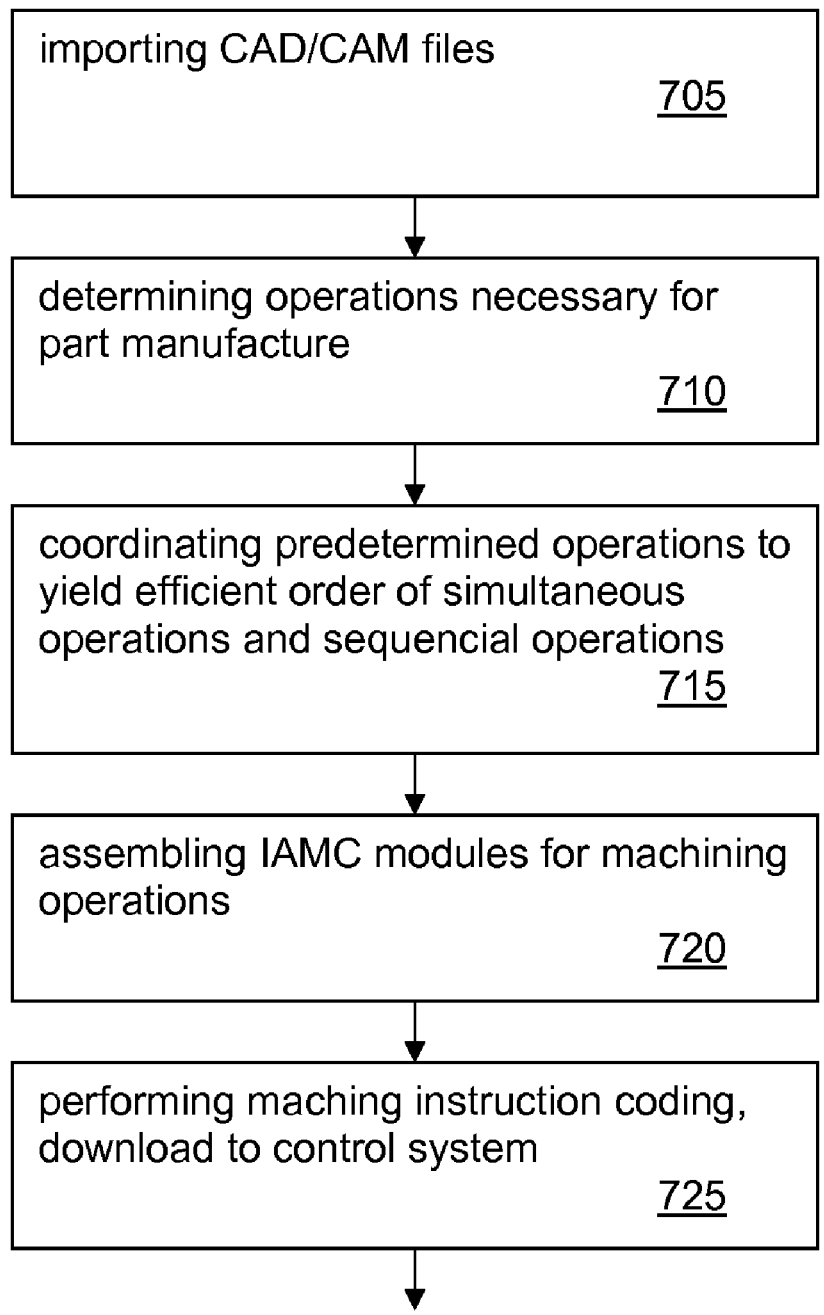

For simplicity, the IAMC embodiment shown in FIGS. 1 and 2 will be used to illustrate the method shown in FIG. 7. A desired component part is created via CAD/CAM software files and the files are imported to the IAMC (step 705) (FIG. 7A). The operations necessary to fabricate the part are derived (step 710) and listed in an order of operations such as growth, post growth stress relief, surface machining, drilling and tempering (peening), for example (step 715). The individual operation modules (stress relief, surface machining, drilling and peening) are coupled; environmentally, mechanically, and electrically, to the common cell 104 and the robotic cart 207 with target plate is positioned (step 720). The order of operations, the operations which may be performed simultaneously, and the instructions for each module are coded, and downloaded to the control system (step 725).

Figure 7B:
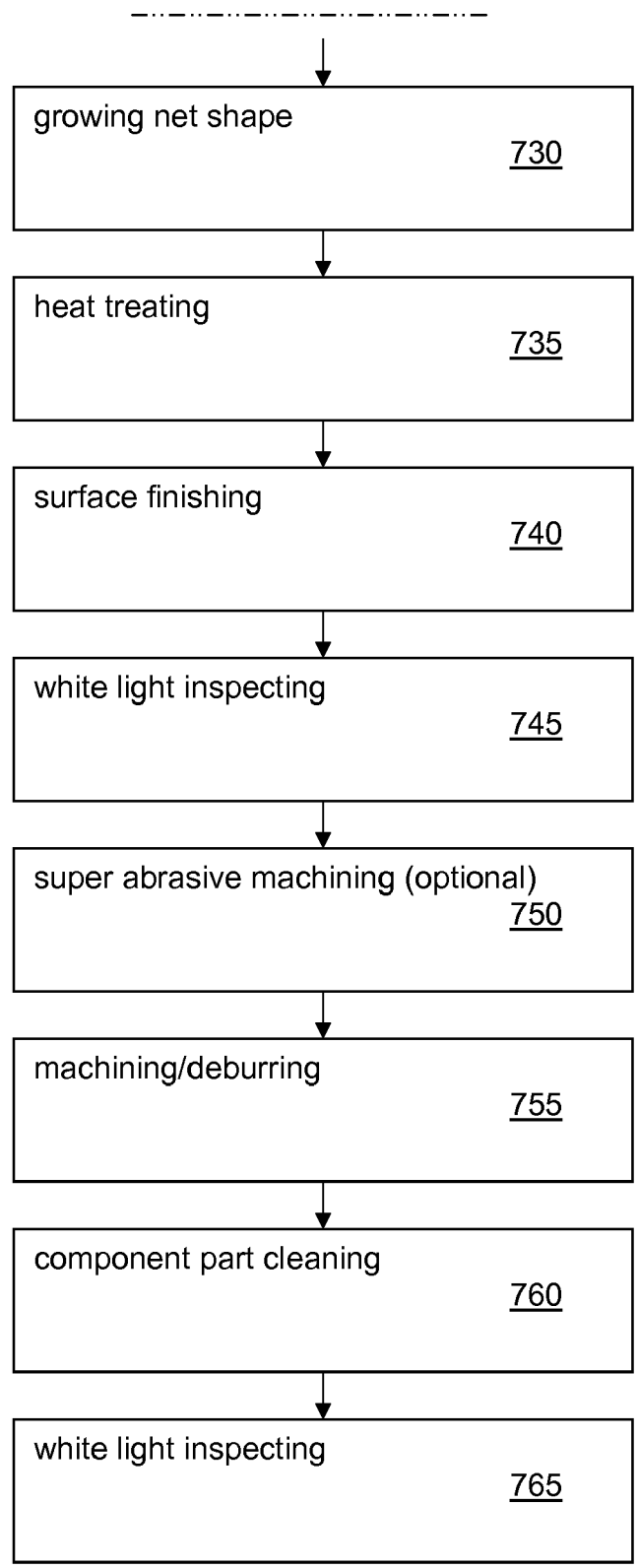

The control system executes the instructions and begins growing the workpiece (step 730) (FIG. 7B). After the growth, the workpiece may be moved and heat treated (annealed) (step 735) to relieve stress prior to having the surface machined (step 740). After annealing, the workpiece may be moved into the common cell for secondary machining operations. A white light inspection may be performed using machine vision to determine the amount of material needed to be removed to bring the part within acceptable tolerances (step 745). If needed, an optional abrasive machining may be performed (step 750) followed with a deburring operation (step 755). One or more of the operations (steps 740, 745, 750, 755, 760, 765) may be performed simultaneously. The workpiece may be cleaned (step 760) in a wash down module and inspected (step 765) prior to being removed from the common cell. The cell configuration and the supervising software will be constructed to allow as many operations to be performed simultaneously as possible.

Methods for the advanced IAMC may be implemented similarly, except that the AMC program handles more secondary machining operations due to its laser machining.

One or more embodiments of the present invention have been described. Nevertheless, it will be understood that various modifications may be made without departing from the spirit and scope of the invention. Accordingly, other embodiments are within the scope of the following claims.

What is claimed is:

1. A method for operating an integrated additive machining cell system comprising:
supplying power and communications from an enclosed central manufacturing cell to a plurality of external modules;
manufacturing a part via an additive manufacturing process;
performing secondary operations with one or more said external modules on the part while said part is in the enclosed central manufacturing cell; and
performing secondary operations on the part in one or more additional said external modules.

2. The method of claim 1 wherein:
the additive manufacturing process occurs in the central manufacturing cell.

3. The method of claim 1 wherein:
the performed secondary operations comprise one or more of drilling, milling, turning, grinding, broaching, reaming, shot peening, grit blasting, and polishing.

4. The method of claim 1 wherein:
the additive manufacturing process comprises a process selected from the group of processes consisting of a powder fed/laser process, a wire fed/laser process, a powder fed/electron beam process, a wire fed/electron beam process, and a short circuit gas metal arc process.

5. The method according to claim 1 wherein:
the additive manufacturing process further includes laser machining for performing simultaneous secondary operations while the additive manufacturing process is underway.

6. The method of claim 1 wherein:
said one or more additional external modules comprise a heat treating oven.

7. The method of claim 1 wherein:
the additive manufacturing process is performed in an additional said external module.

8. A method for operating an integrated additive machining cell system comprising:
supplying power and communications from an enclosed central manufacturing cell to a plurality of external modules;

manufacturing a part via an additive manufacturing process in a said external module; and performing secondary operations with one or more said external modules on the part while said part is in the enclosed central manufacturing cell.

9. The method of claim 8 wherein:

the performed secondary operations comprise one or more of drilling, milling, turning, grinding, broaching, reaming, shot peening, grit blasting, and polishing.

10. The method of claim 8 wherein:

the additive manufacturing process comprises a process selected from the group of processes consisting of a powder fed/laser process, a wire fed/laser process, a powder fed/electron beam process, a wire fed/electron beam process, and a short circuit gas metal arc process.

\* \* \* \* \*